United States Patent [19]

Begrich

[11] Patent Number: 5,118,826
[45] Date of Patent: Jun. 2, 1992

[54] REACTIVE DYES, THEIR PREPARATION AND THE USE THEREOF

[75] Inventor: Rainer Begrich, Rheinfelden, Switzerland

[73] Assignee: Ciba-Geigy Corporation, Ardsley, N.Y.

[21] Appl. No.: 666,273

[22] Filed: Mar. 7, 1991

Related U.S. Application Data

[62] Division of Ser. No. 320,658, Mar. 8, 1989, Pat. No. 5,021,557.

[30] Foreign Application Priority Data

Mar. 17, 1988 [CH] Switzerland .......................... 1003/88

[51] Int. Cl.$^5$ ................................................. C07F 1/08
[52] U.S. Cl. ..................................... 556/115; 544/208
[58] Field of Search ................ 544/179, 180; 556/115, 556/116

[56] References Cited

U.S. PATENT DOCUMENTS

| | | | |
|---|---|---|---|
| 3,068,219 | 12/1962 | Beffa et al. | 534/618 |
| 4,024,123 | 5/1977 | Dussy et al. | 360/146 |
| 4,556,706 | 12/1985 | Hegar et al. | 534/618 |
| 4,604,204 | 8/1986 | Linder et al. | 210/490 |
| 4,841,028 | 6/1989 | Aeschlimann et al. | 534/629 |

FOREIGN PATENT DOCUMENTS

| | | |
|---|---|---|
| 0174909 | 3/1986 | European Pat. Off. . |
| 0210951 | 2/1987 | European Pat. Off. . |
| 0280139 | 8/1988 | European Pat. Off. . |
| 0302115 | 2/1989 | European Pat. Off. . |
| 3718397 | 12/1988 | Fed. Rep. of Germany . |
| 1241516 | 8/1971 | United Kingdom . |
| 1459453 | 12/1976 | United Kingdom . |
| 2172896 | 3/1986 | United Kingdom . |

Primary Examiner—John M. Ford
Assistant Examiner—Y. Gupta
Attorney, Agent, or Firm—Marla J. Mathias; McC. Edward Roberts

[57] ABSTRACT

Reactive dyes of formula

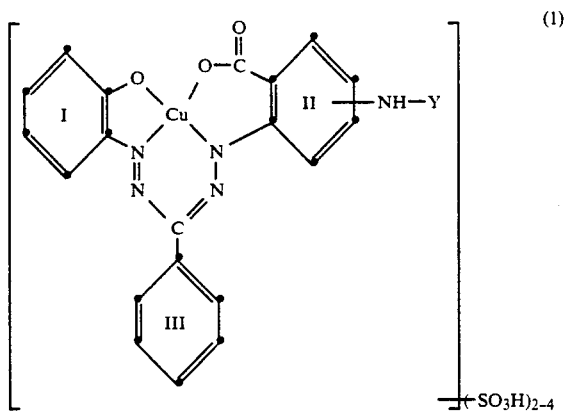

wherein Y is a radical of formula

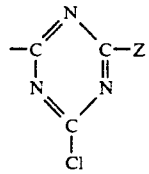

or $$-CO-A-SO_2-X \quad (3)$$

Z is $-NH_2$, an unsubstituted or a substituted aliphatic or aromatic amino group; A is an unsubstituted or a substituted aliphatic or aromatic bridging group, and X is β-sulfatoethyl, β-thiosulfatoethyl, β-phosphatoethyl, β-acyloxyethyl, β-haloethyl or vinyl; the benzene rings I, II and III may contain further substituents in addition to 2 to 4 sulfo groups and, in the benzene ring II, to the radical —NH—Y; and the reactive dyes of formula (1) contain only a single fiber-reactive radical, are especially suitable for dyeing or printing cellulosic fiber materials by the methods customarily employed for reactive dyes, and give dyeings and prints of good fastness properties in high color yield.

4 Claims, No Drawings

REACTIVE DYES, THEIR PREPARATION AND THE USE THEREOF

This is a divisional of Ser. No. 320,658 filed Mar. 8, 1989, now U.S. Pat. No. 5,021,557 issued Jun. 4, 1991.

Reactive dyes are widely used for dyeing and printing textile fibre materials. Although at the present time a large number of useful reactive dyes with different properties and for different fields of application are available, the present state of the art is in many respects not entirely satisfactory in view of the exacting requirements in respect of suitability for specific dyeing processes and of the fastness standard of the dyeings obtained.

The same also applies to reactive dyes for textile printing. The available range of high quality printing dyes is still quite generally incomplete, especially with regard to shade. There is consequently an urgent need to provide further improved reactive dyes.

It is the object of the present invention to provide novel reactive dyes which are especially suitable for printing textile fibre materials. These dyes shall have a high degree of fixation and, at the same time, have the property of being easily washed off to remove non-fixed dye. They shall further have good general fastness properties and, in particular, give good blue shades. It has been found that the novel dyes defined hereinbelow substantially meet these requirements.

Specifically, the present invention relates to reactive dyes of formula

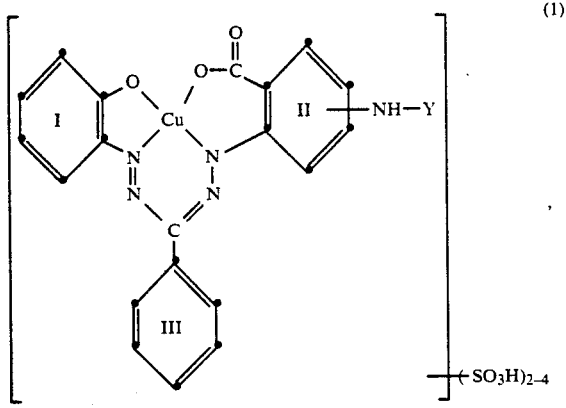

wherein Y is a radical of formula

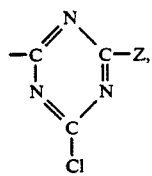

or

Z is $-NH_2$, an unsubstituted or a substituted aliphatic or aromatic amino group; A is an unsubstituted or a substituted aliphatic or aromatic bridging group, and X is $\beta$-sulfatoethyl, $\beta$-thiosulfatoethyl, $\beta$-phosphatoethyl, $\beta$-acyloxyethyl, $\beta$-haloethyl or vinyl; the benzene rings I, II and III may contain further substituents in addition to 2 to 4 sulfo groups and, in the benzene ring II, to the radical $-NH-Y$; and the reactive dyes of formula (1) contain only a single fibre-reactive radical.

Suitable amino groups Z in the chloro-1,3,5-triazinyl radicals are: $-NH_2$, alkylamino, N,N-dialkylamino, cycloalkylamino, N,N-dicycloalkylamino, aralkylamino and arylamino groups, mixed substituted amino groups such as N-alkyl-N-cyclohexylamino and N-alkyl-N-arylamino groups, and also amino groups which contain heterocyclic radicals which may contain further fused carbocyclic rings, and amino groups in which the amino nitrogen atom is a member of an N-heterocyclic ring which may contain further hetero atoms. The alkyl radicals mentioned above may be straight chain or branched and low molecular or higher molecular. $C_1-C_6$alkyl radicals are preferred. Suitable cycloalkyl, aralkyl and aryl radicals are in particular cyclohexyl, benzyl, phenethyl, phenyl and naphthyl radicals. Heterocyclic radicals are in particular furan, thiophene, pyrazole, pyridine, pyrimidine, quinoline, benzimidazole, benzthiazole and benzoxazole radicals. Suitable amino groups in which the amino-nitrogen atom is a member of an N-heterocyclic ring are preferably radicals of 6-membered N-heterocyclic compounds which may contain nitrogen, oxygen and sulfur as further hetero atoms. The above mentioned alkyl, cycloalkyl, aralkyl and aryl radicals, the heterocyclic radicals and the N-heterocyclic rings may be further substituted, for example by halogen such as fluoro, chloro and bromo; by nitro, cyano, trifluoromethyl, sulfamoyl, carbamoyl, $C_1-C_4$alkyl, $C_1-C_4$alkoxy, or acylamino, especially $C_2-C_4$alkanoylamino such as acetylamino and also benzoylamino; ureido, hydroxy, carboxy, sulfomethyl, sulfato, $C_1-C_4$alkylsulfo or sulfo. Typical examples of such amino groups are: $-NH_2$, methylamino, ethylamino, propylamino, isopropylamino, butylamino, hexylamino, $\beta$-methoxyethylamino, $\gamma$-methoxypropylamino, $\beta$-ethoxyethylamino, N,N-dimethylamino, N,N-diethylamino, $\beta$-chloroethylamino, $\beta$-cyanoethylamino, $\gamma$-cyanopropylamino, $\beta$-carboxyethylamino, sulfomethylamino, $\beta$-sulfoethylamino, N-methyl-N-$\beta$-sulfoethylamino, N-ethyl-N-$\beta$-sulfoethylamino, $\beta$-hydroxyethylamino, N,N-bis($\beta$-hydroxyethyl)amino, $\beta$-sufatoethylamino, $\gamma$-hydroxypropylamino, benzylamino, phenethylamino, cyclohexylamino, phenylamino, toluidino, xylidino, chloroanilino, 2-chloro-5-sulfoanilino, 4-chloro-2-sulfoanilino, 4-chloro-3-sulfoanilino, 3- or 4-ureidoanilino, 4-carboxy-3-hydroxyanilino, anisidino, phenetidino, N-methyl-N-phenylamino, N-ethyl-N-phenylamino, N-sulfomethyl-N-phenylamino, 3- or 4-acetylaminoanilino, N-$\beta$-hydroxyethyl-N-phenylamino, 3-acetylamino-4-sulfoanilino, 2-, 3- or 4-sulfoanilino, 2,4- or 2,5-disulfoanilino, 4-sulfomethylanilino, 2-, 3- or 4-carboxyphenylamino, 2-methyl-5-sulfoanilino, 2-carboxy-5-sulfophenylamino, 2-methyl-4-sulfoanilino, 4-methyl-3-sulfoanilino, 3-methyl-4-sulfoanilino, 2-carboxy-4-sulfophenylamino, 4- or 5-sulfonaphth-1-ylamino, 4,6- or 3,6-disulfonaphth-1-ylamino, 3,6,8- or 2,5,7-trisulfonaphth-1-ylamino, 4,6,8-Trisulfonaphth-1-ylamino, 1-sulfonaphth-2-ylamino, 1,5-, 1,6-, 6,8-, 4,8- or 5,7-disulfonaphth-2-ylamino, 1-, 4-, 5-, 6- or 7-sulfonaphth-2-ylamino, morpholino, piperadino and piperazino, 2-methoxy-5-sulfoanilino, 4-methoxy-2-sulfoanilino, 3- or 4-$\beta$-hydroxyethylsulfonylanilino, 4-acetylamino-3-sulfoanilino, 3-carboxy-2-hydroxyanilino, 4,6,8-trisulfonaphth-2-ylamino, 3-

(N,N-dimethylamino)propylamino, 4-sulfo-N-methylanilino, carboxymethylamino, cyclohexylamino, β-hydroxyethylsulfonylethoxyethylamino.

The aliphatic or aromatic bridging member A is preferably an alkylene or arylene radical. Thus A may be a long-chain (i.e. containing 10 or more carbon atoms) or a short-chain, linear or branched, cyclic or bicyclic alkylene radical. A $C_2$-$C_6$alkylene radical is particularly suitable, for example ethylene, propylene, butylene, hexylene, cyclohexylene or endomethylenecyclohexylene. A suitable arylene radical A is, for example, a naphthylene radical, the radical of a diphenyl or stilbene or, preferably, a phenylene radical. The radical A may carry further substituents, for example halogen atoms such as fluorine, chlorine or bromine atoms, $C_1$-$C_4$alkyl groups such as methyl, ethyl or propyl, $C_1$-$C_4$alkoxy groups such as methoxy, ethoxy, propoxy or isopropoxy, and carboxy or sulfo. The preferred meaning of A is $C_2$-$C_6$alkylene or phenylene. The phenylene, propylene or endomethylenecyclohexylene radical is preferred.

X as β-acyloxyethyl is preferably the β-acetoxyethyl radical, and β-haloethyl is preferably the β-chloroethyl radical.

Typical examples of further substituents of the benzene rings I, II and III are $C_1$-$C_4$alkyl groups such as methyl, ethyl, propyl, isopropyl or butyl; $C_1$-$C_4$alkoxy groups such as methoxy, ethoxy, propoxy, isopropoxy or butoxy; $C_1$-$C_8$acylamino groups, preferably $C_2$-$C_6$alkanoylamino groups such as acetylamino, propionylamino or benzoylamino; amino, $C_1$-$C_4$alkylamino such as methylamino, ethylamino, propylamino, isopropylamino or butylamino; phenylamino, N,N-bis(β-hydroxyethyl)amino, N,N-bis(β-sulfatoethyl)amino, sulfobenzylamino, N,N-disulfobenzylamino; $C_1$-$C_4$alkoxycarbonyl such as methoxycarbonyl or ethoxycarbonyl; $C_1$-$C_4$alkylsulfonyl such as methylsulfonyl or ethylsulfonyl; trifluoromethyl, nitro, cyano; halogen such as fluoro, chloro or bromo; carbamoyl, N-$C_1$-$C_4$alkylcarbamoyl such as N-methylcarbamoyl or N-ethylcarbamoyl; sulfamoyl, N-$C_1$-$C_4$alkylsulfamoyl such as N-methylsulfamoyl, N-propylsulfamoyl, N-isopropylsulfamoyl or N-butylsulfamoyl, N-(4-hydroxyethyl)sulfamoyl, N,N-bis(β-hydroxyethyl)sulfamoyl, N-phenylsulfamoyl, ureido, hydroxy, carboxy, sulfomethyl or sulfo. Preferred substituents are methyl, ethyl, methoxy, ethoxy, acetylamino, benzylamino, amino, chloro, bromo, ureido, hydroxy, carboxy, sulfomethyl or sulfo. Most preferably the benzene rings I, II and III contain only sulfo groups. The benzene rings I, II and III together contain 2 to 4 sulfo groups.

Preferred reactive dyes are:

a) Reactive dyes of formula (1), wherein Y is a radical of formula

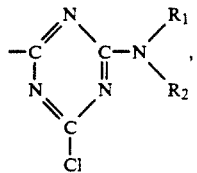
(2a)

wherein $R_1$ and $R_2$ are each independently of the other hydrogen, $C_1$-$C_4$-alkyl or $C_1$-$C_4$alkyl which is substituted by halogen, cyano, $C_1$-$C_4$alkoxy, N,N-dialkylamino containing 1 to 4 carbon atoms in each of the alkyl moieties, hydroxy, carboxy, sulfo or sulfato; or are benzyl, phenethyl, cyclohexyl, phenyl or phenyl which is substituted by halogen, nitro, cyano, trifluoromethyl, sulfamoyl, carbamoyl, $C_1$-$C_4$alkyl, $C_1$-$C_4$alkoxy, hydroxyethylsulfonyl, $C_2$-$C_4$alkanoylamino, benzoylamino, ureido, hydroxy, carboxy, sulfomethyl or sulfo; or are naphthyl or naphthyl which is substituted by halogen, nitro, $C_1$-$C_4$alkoxy, $C_1$-$C_4$alkanoylamino, hydroxy, carboxy or sulfo; or wherein $R_1$ and $R_2$, together with the amino nitrogen atom, form a morpholino, piperidino or piperazino radical.

b) Reactive dyes of formula (1), wherein Y is a radical of formula

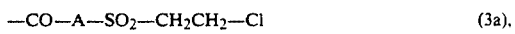

$$—CO—A—SO_2—CH_2CH_2—Cl \quad (3a),$$

wherein A is n-propylene, phenylene or endomethylenecyclohexylene.

c) Reactive dyes of formula (1), wherein the benzene rings I, II and III contain no further substituents.

A particularly preferred reactive dye is that of formula

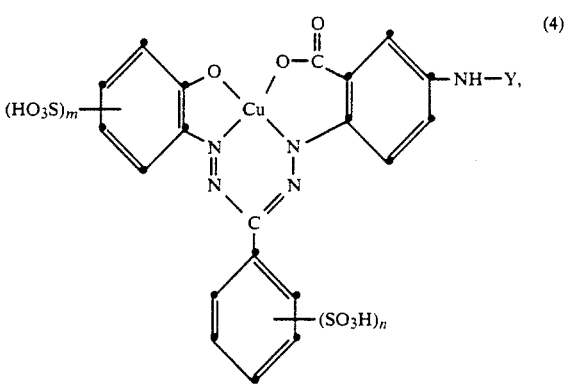

wherein Y is as defined for formula (1), m is 1 or 2 and n is 0, 1 or 2, and the sum of m+n is 2,3 or 4.

Particularly preferred reactive dyes of formula (4) are those of formula

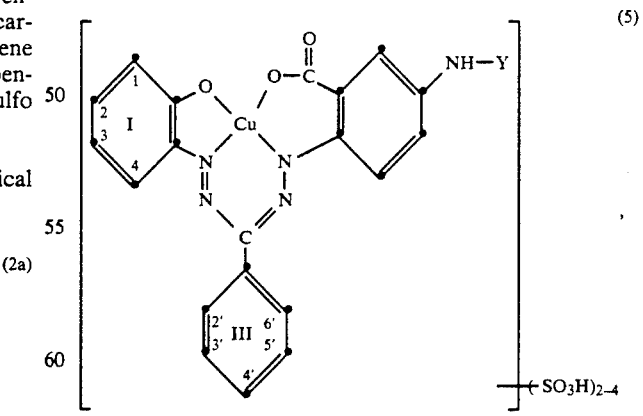

wherein the benzene rings I, II and III carry the 2, 3 or 4 sulfo groups in the following positions: 1,3,3'-trisulfo; 1,2'-disulfo; 1,3-disulfo; 3,2'-disulfo; 1,3,2',4'-tetrasulfo; 1,3,4'-trisulfo; 1,2',4'trisulfo; 3,2',4'-trisulfo; 1,3'-disulfo; or 1,3,2'-trisulfo.

In the reactive dyes of formula (4) and, in particular, in those of formula (5), Y is preferably a radical of formula

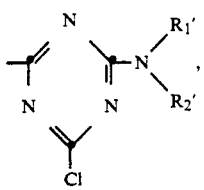
(2a')

wherein —NR$_1$'R$_2$' is —NH$_2$, methylamino, ethylamino, propylamino, isopropylamino, butylamino, hexylamino, β-methoxyethylamino, γ-methoxypropylamino, β-ethoxyethylamino, N,N-dimethylamino, N,N-diethylamino, β-chloroethylamino, β-cyanoethylamino, γ-cyanopropylamino, β-carboxyethylamino, sulfomethylamino, β-sulfoethylamino, N-methyl-N-β-sulfoethylamino, N-ethyl-N-β-sulfoethylamino, β-hydroxyethylamino, N,N-bis(β-hydroxyethyl)amino, β-sulfatoethylamino, γ-hydroxypropylamino, benzylamino, phenethylamino, cyclohexylamino, phenylamino, toluidino, xylidino, chloroanilino, 2-chloro-5-sulfoanilino, 4-chloro-2-sulfoanilino, 4-chloro-3-sulfoanilino, 3- or 4-ureidoanilino, 4-carboxy-3-hydroxyanilino, anisidino, phenetidino, N-methyl-N-phenylamino, N-ethyl-N-phenylamino, N-sulfomethyl-N-phenylamino, 3- or 4-acetylaminoanilino, N-β-hydroxyethyl-N-phenylamino, 3-acetylamino-4-sulfoanilino, 2-, 3- or 4-sulfoanilino, 2,4- or 2,5-disulfoanilino, 4-sulfomethylanilino, 2-, 3-or 4-carboxyphenylamino, 2-methyl-5-sulfoanilino, 2-carboxy-5-sulfophenylamino, 2-methyl-4-sulfoanilino, 4-methyl-3-sulfoanilino, 3-methyl-4-sulfoanilino, 2-carboxy-4-sulfophenylamino, 4- or 5-sulfonaphth-1-ylamino, 4,6- or 3,6-disulfonaphth-1-ylamino, 3,6,8- or 2,5,7-trisulfonaphth-1-ylamino, 4,6,8-trisulfonaphth-1-ylamino, 1-sulfonaphth-2-ylamino, 1,5-, 1,6-, 6,8-, 4,8- or 5,7-disulfonaphth-2-ylamino, 1-, 4-, 5-, 6- or 7-sulfonaphth-2-ylamino, morpholino, piperidino and piperazino, 2-methoxy-5-sulfoanilino, 4-methoxy-2-sulfoanilino, 3- or 4-β-hydroxyethylsulfonylanilino, 4-acetylamino-3-sulfoanilino, 3-carboxy-2-hydroxyanilino, 4,6,8-trisulfonaphth-2-ylamino, 3-(N,N-dimethylamino)propylamino, 4-sulfo-N-methylanilino, carboxymethylamino, cyclohexylamino, β-hydroxyethylsulfonylethoxyethylamino.

Also especially preferred are the reactive dyes of formula (4) and, most particularly, those of formula (5), wherein Y is a radical of formula

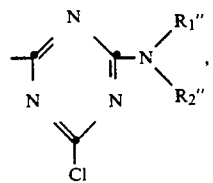
(2a")

and R$_1$" and R$_2$" are each independently of the other hydrogen or C$_1$–C$_4$alkyl, unsubstituted or substituted by halogen, cyano, C$_1$–C$_4$alkoxy, N,N-dialkylamino containing 1 to 4 carbon atoms in each of the alkyl moieties, hydroxy, carboxy, sulfo or sulfato.

The reactive dye of formula

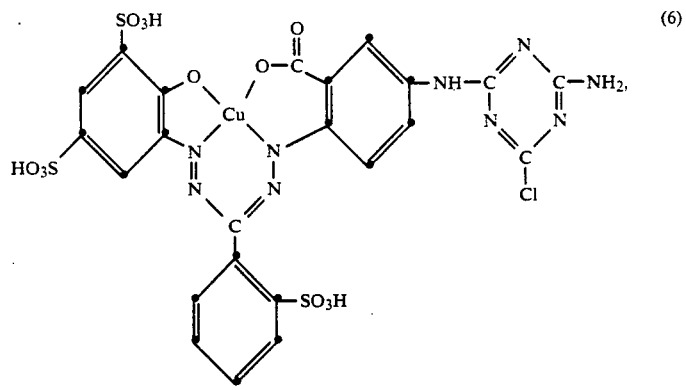
(6)

is particularly preferred.

A further particularly preferred reactive dye is that of formula

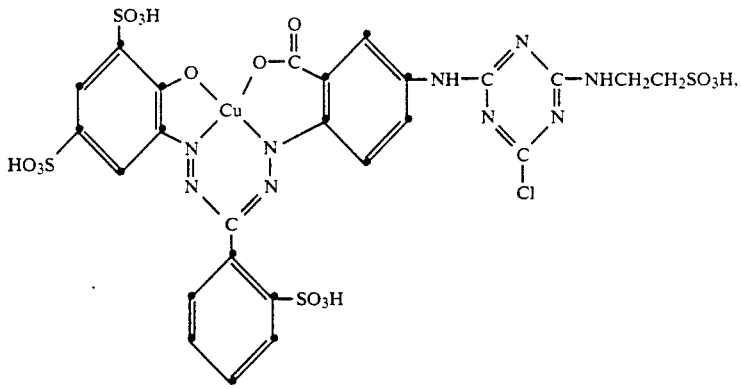

(7)

The radical of formula

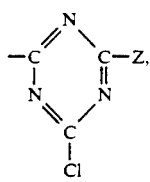

(2)

contained in the dyes of formula (1) is a reactive grouping wherein the chlorine atom is a fibre-reactive leaving group. The radical of formula (3) also contains a reactive radical, namely the —SO$_2$X group. This reactive radical contains a leaving group, for example when X is β-chloroethyl, or according to the nature of fibre-reactive groups, can become active when, for example, X is vinyl (for essential information on reactive dyes, reference is made to K. Venkataramanan, The Chemistry of Synthetic Dyes, New York, Academic Press 1972, Vol. VI, Reactive Dyes).

The process for the preparation of the reactive dyes of formula (1) comprises condensing a compound of formula

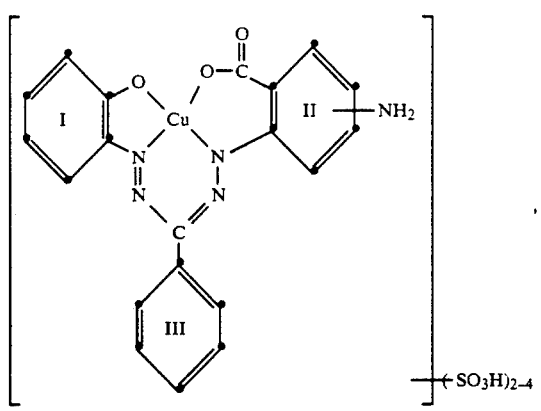

(8)

with 2,4,6-trichloro-s-triazine, and condensing the resultant primary condensate with an amine of formula

H—Z  (9), or with a 2-(Z)amino-4,6-dichloro-s-triazine, or with an acyl halide corresponding to the radical of formula (3), and carrying out a further optional conversion.

Preferred embodiments of the process of this invention comprise:

a) using an amine of formula (9) or a 2-(Z)amino-4,6-dichloro-s-triazine, wherein Z or (Z)amino is the radical —NR$_1$R$_2$, wherein R$_1$ and R$_2$ are each indendependently of the other hydrogen, C$_1$-C$_4$alkyl or C$_1$-C$_4$alkyl which is substituted by halogen, cyano, C$_1$-C$_4$alkoxy, N,N-dialkylamino containing 1 to 4 carbon atoms in each of the alkyl moieties, hydroxy, carboxy, sulfo or sulfato; or are benzyl, phenethyl, cyclohexyl, phenyl or phenyl which is substituted by halogen, nitro, cyano, triflurormethyl, sulfamoyl, carbamoyl, C$_1$-C$_4$alkyl, C$_1$-C$_4$alkoxy, hydroxyethylsulfonyl, C$_2$-C$_4$alkanoylamino, benzoylamino, ureido, hydroxy, carboxy, sulfomethyl or sulfo; or are naphthyl or naphthyl which is substituted by halogen, nitro, C$_1$-C$_4$-alkoxy, C$_1$-C$_4$alkanoylamino, hydroxy, carboxy or sulfo; or wherein R$_1$ and R$_2$, together with the amino nitrogen atom, from a morpholino, piperidino or piperazino radical;

b) using an acyl halide of formula

Hal—CO—A—SO$_2$—CH$_2$CH$_2$Cl  (10), wherein Hal is halogen and A is n-propylene, phenylene or endomethylenecyclohexylene;

c) using a compound of formula (8), wherein the benzene rings I, II and III do not contain further substituents.

A particularly preferred embodiment of the process of this invention comprises using a compound of formula

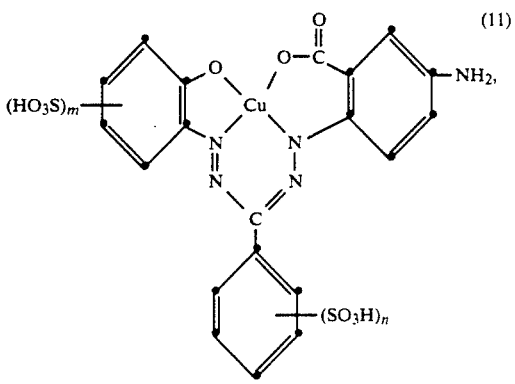

(11)

wherein m is 1 or 2 and n is 0, 1 or 2, and the sum of m+n is 2, 3 or 4.

Very particularly preferred embodiments of the process of this invention comprise condensing a compound of formula (11) with 2,4,6-trichloro-s-triazine and condensing the resultant primary condensate with an amine of formula (9) or with a 2-(Z)amino-4,6-dichloro-s-triazine, wherein Z or (Z)amino is the radical —$NR_1'R_2'$ or —$NR_1''R_2''$ respectively, and $R_1'$, $R_2'$, $R_1''$ and $R_2''$ have the meanings given above.

The important compounds of formula (6) and (7) are obtained by condensing a compound of formula

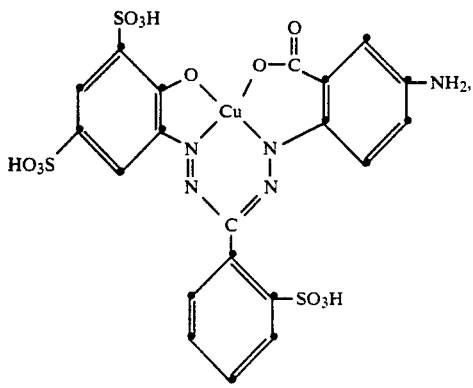

(12)

with 2,4,6-trichloro-s-triazine and condensing the resultant primary condensate with ammonia or β-sulfoethylamine, or with 2-amino-4,6-dichloro-s-triazine or 2-(β-sulfoethylamino)-4,6-dichloro-s-triazine.

Compounds of formula (8) are, for example, the copper complexes of

N-(4-amino-2-carboxyphenyl)-N'-(2'-hydroxy-3',5'-disulfophenyl)-ms-(2''-sulfophenyl)formazan, N-(4-amino-2-carboxyphenyl)-N'-(2'-hydroxy-3',5'-disulfophenyl)-ms-(4''-amino-2''-sulfophenyl)formazan, N-(2-hydroxy-5-sulfophenyl)-N'-(2'-carboxy-4'-aminophenyl)-ms-(2''-sulfophenyl)formazan, N-(2-hydroxy-5-sulfophenyl)-N'-(2'-carboxy-4'-aminophenyl)-ms-(2''-chloro-5''-sulfophenyl)formazan, N-(2-carboxy-4-aminophenyl)-N'-(2'-hydroxy-4'-sulfonaphth-1'-yl)-ms-(2''-sulfophenyl)formazan, N-(4-amino-2-carboxyphenyl)-N'-(2'-hydroxy-3',5'-disulfophenyl)-ms-(3''-sulfophenyl)formazan, N-(4-amino-2-carboxyphenyl)-N'-(2'-hydroxy-3'-sulfophenyl)-ms-(2''-sulfophenyl)formazan, N-(4-amino-2-carboxyphenyl)-N'-(2'-hydroxy-3',5'-disulfophenyl)-ms-(phenyl)formazan, N-(4-amino-2-carboxyphenyl)-N'-(2'-hydroxy-5'-sulfophenyl)-ms-(2''-sulfophenyl)formazan, N-(4-amino-2-carboxyphenyl)-N'-(2'-hydroxy-3',5'-disulfophenyl)-ms-(2'',4''-disulfophenyl)formazan, N-(4-amino-2-carboxyphenyl)-N'-(2'-hydroxy-3',5'-disulfophenyl)-ms-(4''-sulfophenyl)formazan, N-(4-amino-2-carboxyphenyl)-N'-(2'-hydroxy-3'-sulfophenyl)-ms-(2'',4''-disulfophenyl)formazan, N-(4-amino-2-carboxyphenyl)-N'-(2'-hydroxy-5'-sulfophenyl)-ms-(2'',4''-disulfophenyl)formazan, N-(4-amino-2-carboxyphenyl)-N'-(2'-hydroxy-3'-sulfophenyl)-ms-(3'-sulfophenyl)formazan.

Typical examples of amines of formula (9) are: ammonia, methylamine, dimethylamine, ethylamine, diethylamine, propylamine, isopropylamine, butylamine, dibutylamine, isobutylamine, sec-butylamine, tert-butylamine, hexylamine, methoxyethylamine, ethoxyethylamine, methoxypropylamine, chloroethylamine, hydroxyethylamine, dihydroxyethylamine, hydroxypropylamine, glycine, aminoethanesulfonic acid, N-methylaminoethanesulfonic acid, N-ethylaminoethanesulfonic acid, β-sulfatoethylamine, benzylamine, phenethylamine, cyclohexylamine, N-methylaminobenzene, N-ethylaminobenzene, N-propylaminobenzene, N-isopropylaminobenzene, N-butylaminobenzene, N-isobutylaminobenzene, N-sec-butylaminobenzene, N-hexylaminobenzene, N-β-hydroxyethylaminobenzene, N-β-chloroethylaminobenzene, N-β-cyanoethylaminobenzene, N-β-sulfoethylaminobenzene, 1-(N-ethylamino)-2-, -3- or -4-methylbenzene, 1-(N-ethylamino)-2-, -3- or -4-ethylbenzene, 1-(N-ethylamino)-2-, -3- or -4-chlorobenzene, 1-N-ethylaminobenzene-3-or -4-sulfonic acid, 1-(N-ethylamino)-4-butylbenzene, 1-(N-ethylamino)-4-hexylbenzene, 1-(N-ethylamino)-4-octylbenzene, 1-(N-ethylamino)-4-vinylbenzene, 1-N-n-butylamino-3-methylbenzene, 1-(N-ethylamino)-4-fluorobenzene, aniline, o-, m- and p-toluidine, 2,3-, 2,4-, 2,5-, 2,6-, 3,4- and 3,5-dimethylaniline, o-, m- and p-chloroaniline, N-methylaniline, N-ethylaniline, 3- or 4-acetylaminoaniline, 2,5-dimethoxyaniline, o-, m- and p-anisidine, o-, m- and p-phenetidine, 2-methoxy-5-methylaniline, 2-ethoxy-5-methoxyaniline, 4-bromoanilin, 3-aminobenzamide, 4-aminophenylsulfamide, 3-trifluoromethylaniline, 3- and 4-aminophenylsulfamide, 3- and 4-aminophenylurea, 1-naphthylamine, 2-naphthylamine, orthanilic acid, metanilic acid, sulfanilic acid, aniline-2,4-disulfonic acid, aniline-2,5-disulfonic acid, aniline-3,5-disulfonic acid, anthranilic acid, 3-acetylamino-4-sulfoaniline, 2-chloro-5-sulfoaniline, 4-chloro-2-sulfoaniline, 4-chloro-3-sulfoaniline, 4-methyl-3-sulfoaniline, 3-methyl-4-sulfoaniline, 2-methoxy-5-sulfoaniline, 4-methoxy-2-sulfoaniline, 3- or 4-(β-hydroxyethylsulfonyl)aniline, 4-acetylamino-2-sulfoaniline, γ-N,N-dimethylpropylamine, N-methyl-N-β-hydroxyethylamine, hydroxyethylsulfonylethoxyethylamine, o-, m- and p-aminobenzoic acid, 4-aminophenylmethanesulfonic acid, aniline-N-methanesulfonic acid, 2-aminotoluene-4-sulfonic acid, 2-aminotoluene-5-sulfonic acid, m- and p-aminosalicylic acid, 1-amino-4-carboxybenzene-3-sulfonic acid, 1-amino-2-carboxybenzene-5-sulfonic acid, 1-amino-5-carboxybenzene-2-sulfonic acid, 1-naphthylamine-2-, -3-, -4-, -5-, -6-, -7- and -8-sulfonic acid, 2-naphthylamine-1-, -3-, -4-, -5-, -6-, -7- and -8-sulfonic acid, 1-naphthylamine-2,4-, -2,5-, -2,7-, -2,8-, -3,5-, -3,6-, -3,7-, -3,8-, -4,6-, -4,7-, -4,8-, and -5,8-disulfonic acid, 2-naphthylamine-1,5-, -1,6-, -1,7-, -3,6-, -3,7-, -4,7-, -4,8-, -5,7- and -6,8-disulfonic acid, 1-naphthylamine-2,4,6-, -2,4,7-, -2,5,7-, -3,5,7-, -3,6,8- and -4,6,8-trisulfonic acid, 2-naphthylamine-1,3,7-, -1,5,7-, -3,5,7-, -3,6,7-, -3,6,8- and -4,6,8-trisulfonic acid, 2-, 3- and 4-aminopyridine, 2-aminobenzthiazole, 5-, 6- and 8-aminoquinoline, 2-aminopyrimidine, morpholine, piperidine, piperazine, and dehydrothio-p-toluidine-7-sulfonic acid of formula

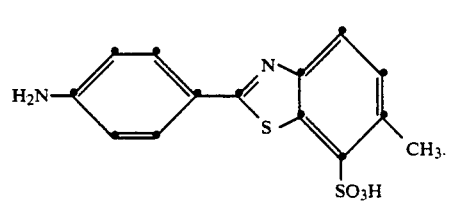

In the preparation of such triazine dyes, the individual process steps may be carried out in different sequence and also in some cases simultaneously. Accordingly, different variants of the process are possible. In general, the reaction is carried out stepwise in succession. Which of the possible process variants give the best results or under which special conditions, for example at which condensation temperature, the reaction shall most conveniently be carried out, will depend on the structure of the starting materials.

Acyl halides that correspond to the radical of formula (3) are known. Such acyl halides are typically:
4-($\beta$-chloroethylsulfonyl)butyryl chloride,
3-($\beta$-chloroethylsulfonyl)benzoyl chloride,
4-($\beta$-chloroethylsulfonyl)benzoyl chloride, and
4-($\beta$-chloroethylsulfonyl)-2,5-endomethylenecyclohexanecarbonyl chloride.

A modification of the process comprises first preparing a dye which is a precursor of the reactive radical and subsequently converting it into the final dye, for example by esterification or by an addition reaction. For example, it is possible to prepare a dye in which X is an HO—$CH_2CH_2$—radical and to react the intermediate with sulfuric acid before or after the acylation, so that the hydroxyl group is converted into the sulfato group; or it is possible to use an analogous dye, wherein X is the group $H_2C=CH$—, and to form an $HO_3SS$—$CH_2CH_2$ radical by addition of thiosulfuric acid to the intermediate. The sulfation of the hydroxyl group in a dye of formula (1), or in a suitable precursor, is carried out preferably by reaction with concentrated sulfuric acid at 0° C. to moderately elevated temperature. This sulfation can also be carried out by reacting the hydroxy compound with 2 equivalents of chlorosulfonic acid per hydroxyl group, in a polar organic solvent, for example N-methylpyrrolidone, in the temperature range from 10° to 80° C. It is preferred to carry out the sulfation by adding the appropriate compound to sulfuric acid monohydrate in the temperature range from 5° to 15° C. The introduction of another radical X into a compound of formula (1) or an intermediate, instead of a halogen atom or the sulfato group, for example a thiosulfato or acetato group, is effected in a manner known per se. The route for synthesing the compounds of formula (1) via a precursor proceeds for the most part uniformly and completely.

Furthermore, elimination reactions may be carried out directly after the synthesis. For example, reactive dyes of the formula (1) which contain chloroethylsulfonyl or sulfatoethylsulfonyl radicals can be treated with a dehydrohalogenating agent such as sodium hydroxide to convert the chloroethylsulfonyl or sulfatoethylsulfonyl radicals into vinylsulfonyl radicals.

The condensation of the 2,4,6-trichloro-s-triazine with a compound of formula (8) is preferably carried out in aqueous solution or suspension at low temperature, preferably in the range from 0° to 5° C., and at a weakly acid, neutral or weakly alkaline pH value. The hydrogen chloride evolved during the condensation is conveniently neutralised continuously by addition of an aqueous alkali metal hydroxide, carbonate or bicarbonate. For the further reaction of the resultant chlorotriazine dye or for the reaction of the 2,4,6-trichloro-s-triazine with the amines of formula (9), the free amines or their salts, preferably in the form of the hydrochloride, are used. The reaction is carried out in the temperature range from about 0° to 40° C., preferably from 5° to 25° C., using an acid acceptor, preferably sodium carbonate or an excess of the amine, in a pH range from 2 to 10, preferably from 5 to 8.

The condensation of an acyl halide with a compound of formula (8) is likewise preferably carried out in aqueous solution or suspension at room temperature and at a weakly acid to neutral pH value. Here too the hydrogen halide evolved in the course of the condensation is conveniently neutralised by the continuous addition of an aqueous alkali metal hydroxide, carbonate or bicarbonate.

The reactive dyes of formula (1) can be isolated and processed to useful dry dye formulations. Isolation is preferably effected at as low temperature as possible by salting out and filtration. The dyes isolated by filtration can be dried after the optional addition of an extender and/or buffer, for example after addition of a mixture of equal parts of monosodium and disodium phosphate or of sodium tripolyphosphate. Drying is preferably carried out at not too high temperature and under reduced pressure. In certain cases, the dry dye formulations of this invention can be prepared direct by spray drying the entire reaction mixture, i.e. without first isolating the dyes.

The invention further relates to storage-stable concentrated liquid dye formulations of the reactive dyes of formula (1) and to the use thereof for the preparation of padding liquors, dye baths and, in particular, printing pastes, which are used for dyeing and printing fibre materials, especially cellulosic fibre materials.

Liquid dye formulations have advantages over powder formulations, for example no dust formation when preparing printing pastes and padding and dye liquors, no wetting problems caused by lump formation, no specky dyeings caused by undissolved dyestuff particles. Such liquid dye formulations should be highly concentrated (at least 10% by weight, and preferably more than 15% by weight, dye concentration), and should be storable at least for several months in a broad temperature change (from −10° to +40° C.) without undergoing physical changes.

As suitable starting solution or suspension for the preparation of the dye formulations it is possible to use the aqueous solution or suspension obtained direct from the synthesis and which may contain solvent, or an aqueous suspension of the moist filter cake of the crude dyes containing different amounts of undesired dissolved substances of low molecular weight, especially by-products formed during the synthesis of the dye and dissolved inorganic and organic salts. In cases in which the condensation product either cannot be salted out or can only be salted out with the greatest difficulty, it is also possible to use direct the crude condensation or neutralisation solution. It is convenient to use starting solutions or suspensions that contain 2 to 50% of dye.

A start may also be made from the dry powder of the crude dye if it is first suspended in water.

The concentrated liquid formulations of this invention are normally true or colloidal solutions. They are of low viscosity (viscosity of ca. 5 to 300 cP/20° C.) and have good storage stability, i.e. they remain in a ready-for-use state for at least several months in the temperature range form −20° to +60° C., in particular from −10° to +40° C. These formulations can be used for the preparation of padding liquors, dye baths and printing pastes with water as well as with organic solvents and/or thickeners, without precipitation of the dye or the occurrence of other inhomogeneities. The cited padding liquors, dye baths and printing pastes can be used, for example, for dyeing or printing textile materials of natural or synthetic fibre materials, especially cellulosic fibre materials, in known manner.

The stable concentrated liquid dye formulations of this invention are especially suitable for the preparation of printing pastes for printing cellulosic fibre materials.

A process for the preparation of a liquid formulation is described in the Preparatory Examples.

The reactive dyes of formula (1) are novel. They are distinguished by high reactivity and give dyeings of good wet- and lightfastness properties. It must be singled out for special mention that the dyes have good solubility and excellent dye fixation, and that they diffuse readily into the cellulose fibres, and that non-fixed dye can be easily washed off.

The reactive dyes of the formula (1) are suitable for dyeing and printing a very wide range of materials such as silk, leather, wool, polyamide fibres and polurethanes, and especially cellulosic materials of fibrous structure such as linen, cellulose, regenerated cellulose and, most particularly, cotton. They are suitable both for the exhaust process and also for dyeing by the pad-dyeing process, in which the goods are impregnated with aqueous and, if appropriate, also with salt-containing dye solutions, and the dyes are fixed after treatment with an alkali, or in the presence of an alkali, with or without the application of heat. The dyes of formula (1) are especially suitable for printing, preferably on cotton, and also for printing nitrogen-containing fibres, e.g. wool, silk and blends containing wool.

It is advisable to rinse the dyeings and prints thoroughly with cold and hot water, optionally with the addition of a compound which acts as a dispersant and promotes the diffusion of non-fixed dye.

For use in actual practice, the dyes of this invention are conveniently used as liquid dyeing or printing formulations.

The formazan used in the following Examples as starting material has the formula

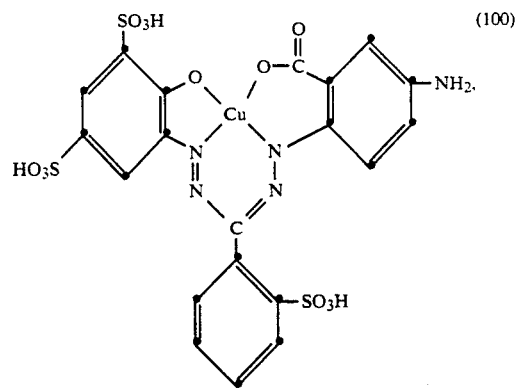

EXAMPLE 1

To a neutral solution of 33.8 parts by weight of the formazan of formula (100) in 400 parts by volume of water are added 10.0 parts by weight of cyanuric chloride at 0°–5° C. During the condensation, the pH is first allowed to fall to 4.0 and then kept at this value by addition of 21 parts by volume of 2N aqueous sodium hydroxide. Thereafter 16 parts by volume of 30% ammonia are added. Condensation is then carred out at the initial pH value of 10.5 and at 40° C. until the reaction is complete, whereupon the pH falls to 9. The pH is adjusted to 7.5 by addition of 6 parts by volume of 1ON HCl, and the dye of formula

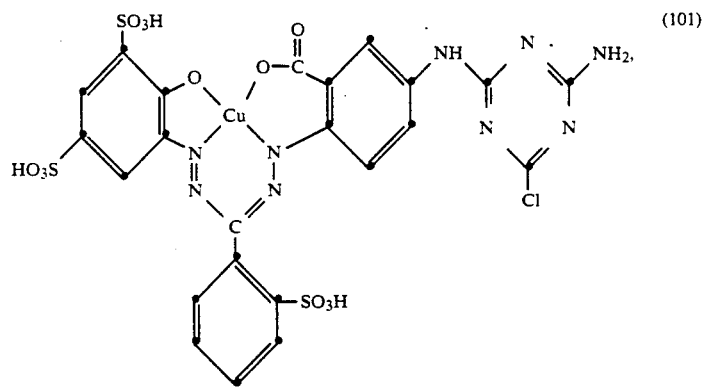

is subsequently salted out with sodium chloride. Cotton can be dyed or printed in neutral blue shades with the resultant dark blue dye powder.

Further dyes are obtained by using equivalent amounts of the amines listed below instead of ammonia.

| Example | Amines |
| --- | --- |
| 2 | aniline-2,5-disulfonic acid |
| 3 | methylamine |
| 4 | ethanolamine |
| 5 | diethanolamine |
| 6 | 2-methylaniline-5-sulfonic acid |
| 7 | n-butylamine |
| 8 | aniline |
| 9 | N-methylaniline |
| 10 | N-ethylaniline |
| 11 | m-toluidine |
| 12 | p-toluidine |
| 13 | m-chloroaniline |
| 14 | p-chloroaniline |

-continued

| Example | Amines |
|---|---|
| 15 | o-anisidine |
| 16 | p-anisidine |
| 17 | p-phenetidine |
| 18 | p-aminobenzoic acid |
| 19 | aniline-3-sulfonic acid |
| 20 | 4-aminoacetanilide |
| 21 | 3-aminophenylurea |
| 22 | 4-aminophenylurea |
| 23 | diethylamine |
| 24 | morpholine |
| 25 | 2-naphthylamine-6-sulfonic acid |
| 26 | 4-aminosalicylic acid |
| 27 | aniline-2,4-disulfonic acid |
| 28 | 1-naphthylamine-4-sulfonic acid |
| 29 | 1-naphthylamine-5-sulfonic acid |
| 30 | 2-naphthylamine-6,8-disulfonic acid |
| 31 | 2-naphthylamine-4,8-disulfonic acid |
| 32 | 2-naphthylamine-5,7-disulfonic acid |
| 33 | 1-naphthylamine-3,6-disulfonic acid |
| 34 | 1-naphthylamine-4,6-disulfonic acid |
| 35 | 2-naphthylamine-3,6,8-trisulfonic acid |
| 36 | piperidine |
| 37 | piperazine |
| 38 | o-toluidine |
| 39 | aniline-2-sulfonic acid |
| 40 | aniline-4-sulfonic acid |
| 41 | 3-aminoacetanilide |
| 42 | 3-aminoacetanilid-4-sulfonic acid |
| 43 | dehydro-thio-p-toluidine-7-sulfonic acid |
| 44 | 2-chloroaniline-5-sulfonic acid |
| 45 | 4-chloroaniline-2-sulfonic acid |
| 46 | 4-chloroaniline-3-sulfonic acid |
| 47 | 2-aminotoluene-5-sulfonic acid |
| 48 | 4-aminotoluene-2-sulfonic acid |
| 49 | 5-aminotoluene-2-sulfonic acid |
| 50 | 2-methoxy-aniline-5-sulfonic acid |
| 51 | 4-methoxy-aniline-2-sulfonic acid |
| 52 | m-aminobenzoic acid |
| 53 | o-aminobenzoic acid |
| 54 | N-methyltaurine |
| 55 | N-ethyltaurine |
| 56 | 2-amino-ethylsulfate |
| 57 | 4-aminophenyl-β-hydroxyethysulfone |
| 58 | ethylamine |
| 59 | propylamine |
| 60 | dimethylamine |
| 61 | 4-aminoacetanilide-3-sulfonic acid |
| 62 | 3-aminosalicylic acid |
| 63 | 2-naphthylamine-5-sulfonic acid |
| 64 | 2-naphthylamine-7-sulfonic acid |
| 65 | 2-naphthylamine-4-sulfonic acid |
| 66 | 2-naphthylamine-1-sulfonic acid |
| 67 | 1-naphthylamine-6-sulfonic acid |
| 68 | 1-naphthylamine-7-sulfonic acid |
| 69 | 2-naphthylamine-1,5-disulfonic acid |
| 70 | 2-naphthylamine-1,6-disulfonic acid |
| 71 | 1-naphthylamine-2,5,7-trisulfonic acid |
| 72 | 2-naphthylamine-4,6,8-trisulfonic acid |
| 73 | N,N-dimethylpropylenediamine |
| 74 | N-methylsulfanilic acid |
| 75 | anilino-methanesulfonic acid |
| 76 | glycine |
| 77 | 3-aminopropanol |
| 78 | 2-methoxyethylamine |
| 79 | 2-methylaminoethanol |
| 80 | 3-aminophenyl-β-hydroxyethylsulfone |
| 81 | aminocyclohexane |
| 82 | 2-(2-aminoethoxy)-2'-hydroxydiethylsulfone |
| 83 | aminomethanesulfonic acid |

PREPARATION OF A CONCENTRATED LIQUID DYE FORMULATION 9 kg of the filter cake of the crude dye of the formula as indicated in Example 1 are suspended in 35 kg of water. The resultant suspension having a solids content of 7.9% (ca. 5.9% of dye and 2.07% NaCl) is deinoised and concentrated in a reverse osmosis unit (membrane surface area: 0.84 m$^2$) which has been prepared as described in European patent application 59 782 and which has a cut-off level of 500. The reverse osmosis is carried out at pH 6.5-7.5, at 20° C., and under a presure of 25 bar in two steps:

a) Deionisation:

Addition of 40 l of water and subsequent removal of 40 l of permeate (average rate of flow: ca. 20 l/h) gives a dye solution with a salt concentration of 0.43%.

b) Concentration:

After deionisation, 33.1 l of permeate (average rate of flow: ca. 12 l/h) are removed, affording 10.9 kg of a concentrated dye solution having a solids content of 23.6% and a sodium chloride concentration lower than 0.01%.

With stirring, 1.5 parts of sodium tripolyphosphate are added at 40° C. over 10 minutes to 94.4 parts of the dye solution so obtained. After dilution with 4.2 parts of water, a liquid formulation of the following composition having a pH of 7.0 is obtained:

22.3% by weight of dye 1.5% by weight of sodium tripolyphosphate ca. 76.3% by weight of water <0.1% by weight of sodium chloride.

The true solution so obtained is of low viscosity (ca. 6 cP at 20° C., Brookfield spindle No. 2) and is storage-stable for several months at −10° C. to +40° C. without undergoing physical change. (Chemical and physical storage stability).

In place of the filter cake used in the Example, it is also possible to use an equivalent amount of the neutralised synthesis solution (after suitably adjusting the concentration, if necessary).

The liquid commercial formulation so obtained can be used instead of the dye powder in all dyeing and printing recipes with the same results.

EXAMPLE 84

33.8 parts by weight of the formazan chromophore of formula (100) are suspended in 500 ml of water and dissolved at pH 7 by addition of aqueous sodium hydroxide. A solution of 14.5 parts by weight of β-chloroethyl-4-benzoyl sulfochloride in 50 parts by volume of acetone is then added dropwise. The pH is kept in the range from 5-6 by the further addition of 2N aqueous sodium hydroxide. No more free amino group is detectable after stirring for about 4 hours at the same pH and at room temperature. The dye of formula

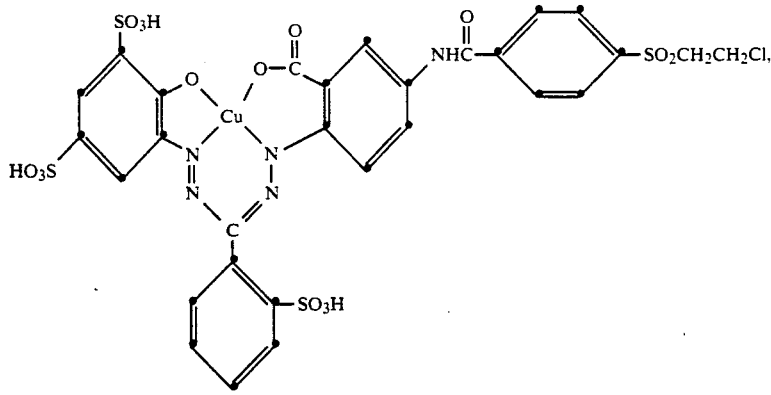
(102)

is isolated by salting out. It dyes cotton in a very fast neutral blue shade.

Dyes of comparably good properties and of the same shade are prepared by acylating equivalent amounts of the following acyl chlorides:

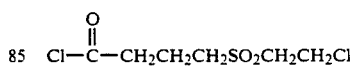

EXAMPLE 88

A neutral solution of 33.8 parts by weight of the formazan chromophore of formula (100) in 400 parts by volume of water is run into a finely particulate suspension of 9.4 parts by weight of cyanuric chloride in 25 parts by volume of water such that the pH can be kept at 4.5 by the simultaneous addition of 1N aqueous sodium hydroxide. The temperature is kept at 0°–5° C. by cooling. After determining the completion of the first condensation by chromatography, a solution of 6.25 parts by weight of taurine in 65 parts by volume of water is tipped in. The pH is adjusted to 8.5 by addition of aqueous sodium hydroxide and kept at 8.5 after warming to 40° C. (Consumption of 1N aqueous sodium hydroxide: ca. 165 parts by volume). Upon completion of the second condensation, the pH is adjusted to 7.0 with a small amount of concentrated hydrochloric acid. After deionisation and concentration by evaporation, a black-blue dye powder of formula

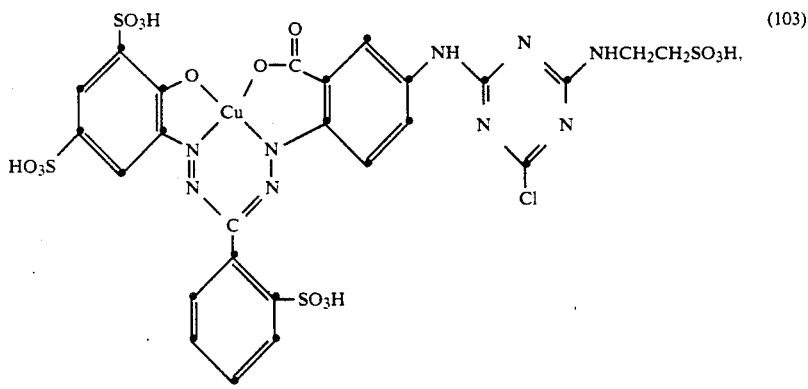
(103)

is obtained, with which cotton can be dyed and printed in a very fast clear, neutral blue shade.

Dyes of comparably good properties and of similar shade are obtained by repeating the procedures described in Examples 1 to 88 and replacing the formazan of formula (100) by a compound of the following formulae (104) to (112):

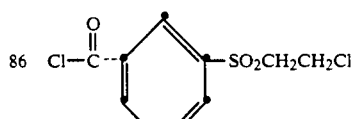

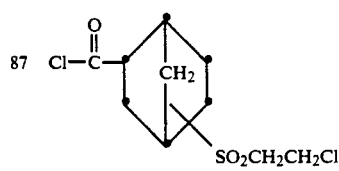

-continued
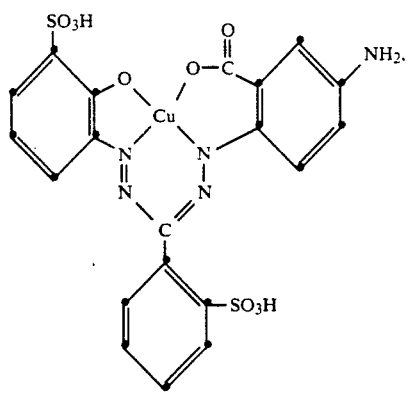
(105)
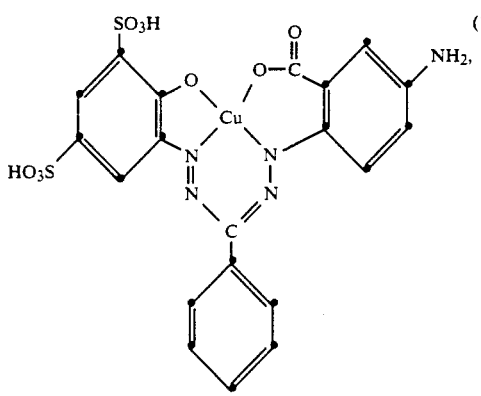
(106)
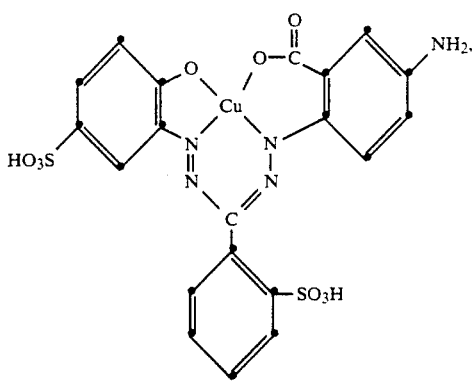
(107)
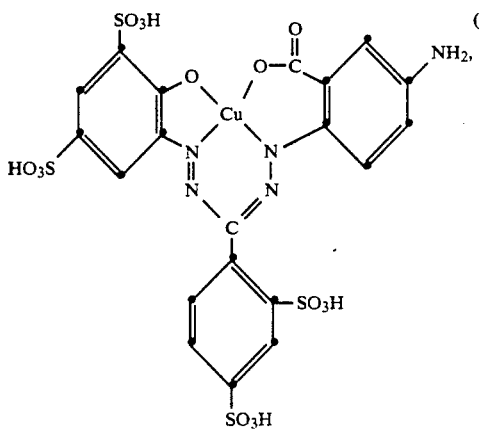
(108)
-continued
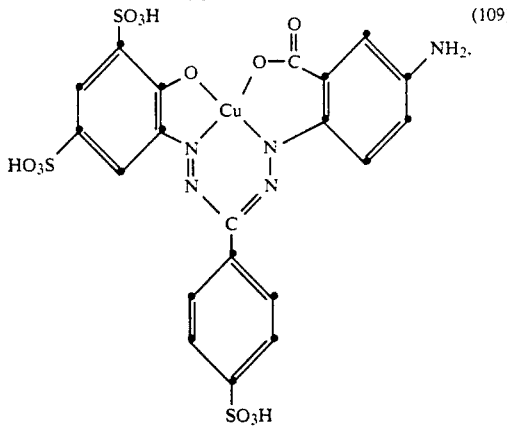
(109)
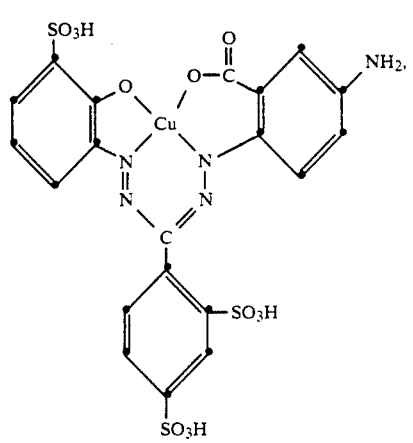
(110)
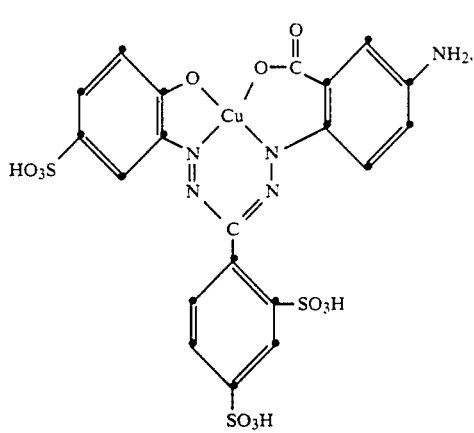
(111)
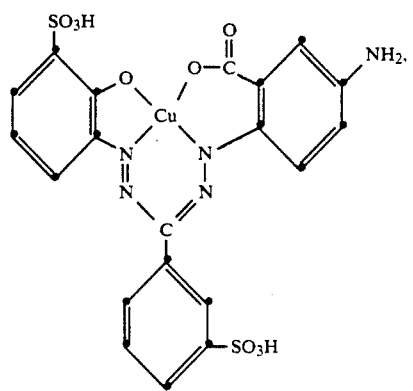
(112)

DYEING PROCEDURE 1

2 parts of the dye obtained in Example 1 are dissolved at 20° to 50° C. in 100 parts of water by adding 5 to 20 parts of urea and 2 parts of calcined sodium carbonate. A cotton fabric is impregnated with this solution to a pick-up of 50 to 80% and then dried. The fabric is then thermofixed for 1½ to 5 minutes at 140° to 210° C., subsequently soaped for a quarter of an hour in a 0.1% boiling sulution of a non-ionic detergent, rinsed and dried.

DYEING PROCEDURE 2

2 parts of the dye obtained in Example 1 are dissolved at 75° C. in 2000 parts of water by adding 120 parts of sodium chloride or calcined Glauber's salt. Then 100 parts of a cotton fabric are put into this dyebath and the temperature is kept constant for 30 to 60 minutes. Then 10 parts of calcined sodium carbonate and 4 ml of sodium hydroxide solution (36° Bé) are added. The temperature is kept for a further 45 to 60 minutes at 75° to 80° C. and the fabric is then soaped for 15 minutes in a 0.1% boiling solution of a non-ionic detergent, rinsed and dried.

DYEING PROCEDURE 3

2 parts of the dye obtained in Examople 1 are disolved in 100 parts of water while adding 0.5 part of sodium m-nitrobenzenesulfonate. A cotton fabric is impregnated with this solution to a liquor pick-up of 75% and then dried. The fabric is then impregnated with a solution of 20° C. which contains 5 g/l of sodium hydroxide and 300 g/l of sodium chloride, and then expressed to a pick-up of 75%. The dyeing is steamed for 30 seconds at 100° to 101° C., rinsed, soaped for a quarter of an hour in a 0.3% boiling solution of a nonionic detergent, rinsed and dried.

DYEING PROCEDURE 4

2 parts of the dye obtained in Example 1 are dissolved in 100 parts of water. The solution is added to 1900 parts of cold water, 60 parts of sodium chloride are added and 100 parts of a cotton fabric are put into this dyebath. The temperature is raised to 60° C. and 40 parts of calcined sodium carbonate and another 60 parts of sodium chloride are added after 30 minutes. The temperature is kept for 30 minutes at 60° C. The dyeing is rinsed and then soaped for 15 minutes in a 0.3% boiling solution of a non-ionic detergent, rinsed and dried.

PRINTING PROCEDURE 2 parts of the dye obtained according to Example 1 are strewed, with rapid stirring, into 100 parts of a stock thickening which contains 45 parts of 5% sodium alginate thickening, 32 parts of water, 20 parts of urea, 1 part of sodium m-nitrobenzenesulfonate and 2 parts of sodium carbonate.

A cotton fabric is printed with the printing paste so obtained on a roller printing machine. The printed fabric is steamed 4 to 8 minutes at 100° C. in saturated steam, then thoroughly rinsed in cold and hot water, in the process of which chemically nonfixed dye can be very easily removed from the fabric, and then dried.

PRINTING PROCEDURE 2 a) A stock thickening is prepared by thoroughly mixing the following components in a stirred container:

500 kg of a 5% sodium alginate solution of high viscosity,
125 kg of urea,
12.5 kg of the sodium salt of nitrobenzenesulfonic acid,
75 kg of a 25% solution of sodium carbonate, and
287.5 kg of water.

b) Into 800 g of this stock thickening are then stirred manually 200 g of the liquid formulation of the reactive dye as indicated in Example 1. A homogeneous ready-for-use printing ink is obtained. A fabric of mercerised bleached cotton is printed with a portion of this printing ink.

20 g of the remainder of the printing ink are weighed and mixed manually with 980 g of the above thickening. Mercerised bleached cotton fabric is printed with this printing ink.

After drying, both prints are fixed in saturated steam and then rinsed in cold and hot water.

The first print results in a strong, brillant and level coloured motif, and the second print results in a pastel-coloured, totally non-specky and level motif.

What is claimed is:

1. A reactive dye of formula

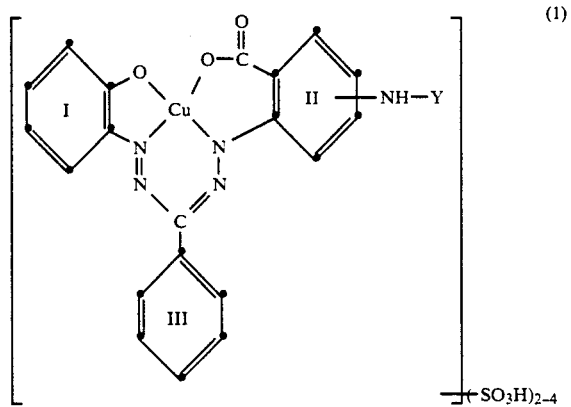

wherein Y is $$-CO-A-SO_2-X \qquad (3)$$

A is an unsubstituted alkylene or arylene radical or an alkylene or arylene radical which is substituted by halogen, $C_1$-$C_4$ alkyl, $C_1$-$C_4$ alkoxy, carboxy or sulfo group, and X is β-sulfatoethyl, β-thiosulfatoethyl, β-phosphatoethyl, β-acyloxyethyl, β-haloethyl or vinyl; the benzene rings I, II and III may contain further substituents in addition to 2 to 4 sulfo groups and, in the benzene ring II, to the radical —NH—Y; and the reactive dye of formula (1) contains only a single fibre-reactive radical.

2. A reactive dye according to claim 1, wherein Y is a radical of formula $$-CO-A-SO_2-CH_2CH_2-Cl \qquad (3a)$$

wherein A is n-propylene, phenylene or endomethylenecyclohexanediyl.

3. A reactive dye according to claim 1, wherein the benzene rings I, II and III do not contain further substituents.

4. A reactive dye according to claim 1, of formula

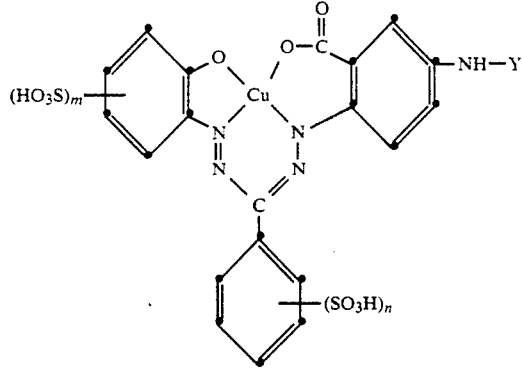
(4)
wherein Y is as defined in claim 1, m is 1 or 2, and n is 0, 1 or 2, and the sum of m+n is 2, 3 or 4.
* * * * *
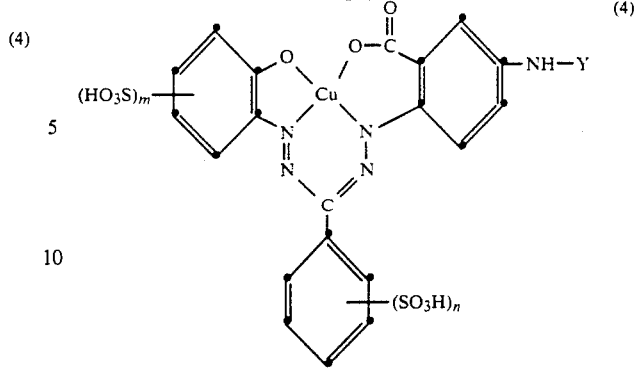
(4)
wherein Y is as defined in claim 1, m is 1 or 2, and n is 0, 1 or 2, and the sum of m+n is 2, 3 or 4.
* * * * *